United States Patent [19]
Okawa et al.

[11] Patent Number: 6,093,988
[45] Date of Patent: Jul. 25, 2000

[54] ROTATING ELECTRIC MACHINE USABLE IN RADIOACTIVE ENVIRONMENT

[75] Inventors: Yoshinao Okawa, Ibaraki; Yoshihiro Murano, Chiba; Isao Ito, Ibaraki; Kenichi Okada, Chiba; Kazuo Funabashi; Masanori Miyamoto, both of Ibaraki; Kiyohito Mizuide, Chiba; Hirotugu Kinoshita; Fumihiro Itano, both of Yokohama; Takeshi Uesugi, Tokyo, all of Japan

[73] Assignees: Kabushiki Kaisha Meidensha; Kandenko Co., Ltd., both of Tokyo, Japan

[21] Appl. No.: 09/187,484

[22] Filed: Nov. 6, 1998

[30] Foreign Application Priority Data

Nov. 6, 1997 [JP] Japan ................................. 9-304044

[51] Int. Cl.⁷ .............................. H02K 5/04; H02K 5/06; H02K 5/15
[52] U.S. Cl. ................................ 310/85; 310/89; 310/90; 508/581; 508/552; 384/476; 384/627; 250/515.1; 376/287
[58] Field of Search ................................. 310/85, 88, 89, 310/90, 254, 258; 508/136, 552, 581; 384/627, 476; 250/515.1; 376/287, 288

[56] References Cited

U.S. PATENT DOCUMENTS

| | | |
|---|---|---|
| 3,266,999 | 8/1966 | Wood et al. ............................. 376/287 |
| 3,716,732 | 2/1973 | Tillma ...................................... 310/61 |
| 4,711,732 | 12/1987 | Arakawa .................................. 252/28 |
| 4,753,741 | 6/1988 | Arakawa et al. ........................ 252/25 |
| 4,766,387 | 8/1988 | Browne et al. .......................... 324/545 |
| 4,909,641 | 3/1990 | McKenzie ............................... 384/536 |
| 5,569,643 | 10/1996 | Kinoshita et al. ....................... 508/155 |
| 5,814,824 | 9/1998 | Hamby et al. ........................... 250/515.1 |

FOREIGN PATENT DOCUMENTS 9-028065  1/1997  Japan ..................................... 310/211

*Primary Examiner*—Nicholas Ponomarenko
*Assistant Examiner*—Karl Imayoshi Tamai
*Attorney, Agent, or Firm*—Foley & Lardner

[57] ABSTRACT

The invention relates to a rotating electric machine including (a) a rotor having a rotating shaft; (b) a bearing for supporting the rotating shaft; (c) a radiation resistant grease applied to the bearing; and (d) a shield layer for shielding the grease from radiation. The shield layer is made of lead and surrounds the bearing. The shield layer includes (1) a first cylindrical shield member that is positioned to cover the bearing, such that the bearing is shielded from a first radiation that is in a direction substantially perpendicular to an axis of the rotating shaft, and (2) second and third disk shield members that are positioned to interpose therebetween the bearing in a direction along the axis of the rotating shaft, such that the bearing is shielded from a second radiation that is in a direction substantially along the axis of the rotating shaft. Thus, the rotor of this rotating electric machine is stably supported in the bearing for a long time even under a highly radioactive environment. That is, the rotating electric machine can be rotated stably for a long time.

13 Claims, 1 Drawing Sheet

ROTATING ELECTRIC MACHINE USABLE IN RADIOACTIVE ENVIRONMENT

BACKGROUND OF THE INVENTION

The present invention relates to a rotating electric machine usable in radioactive environment, such as nuclear facilities, for example, a nuclear power plant.

Many rotating electric machines are used in nuclear facilities such as a nuclear power plant. Thus, it is important to take preventive measures against radiation in the use of rotating electric machines. For example, it is known to apply a radiation resistant grease to bearings of the rotating electric machine for maintaining durability of the rotating electric machine. Such a rotating electric machine may have a sufficient radiation resistance in a low radioactive environment such as light-water reactor. There is, however, a recent demand for a rotating electric machine that is usable in a highly radioactive environment such as future thermonuclear fusion reactors.

SUMMARY OF THE INVENTION

It is therefore an object of the present invention to provide a rotating electric machine that is usable under a highly radioactive environment having, for example, about $10^{10}$ rad.

It is a more specific object of the present invention to provide a rotating electric machine that can be rotated stably for a long time by stably supporting the rotor in bearings for a long time even under such a highly radioactive environment.

According to the present invention, there is provided a rotating electric machine comprising (a) a rotor having a rotating shaft; (b) a bearing for supporting the rotating shaft; (c) a radiation resistant grease applied to the bearing; and (d) a shield layer for shielding the grease from radiation. This shield layer is made of lead and surrounds the bearing. The rotor of this rotating electric machine is stably supported in the bearing for a long time even under a highly radioactive environment, due to the use of the shield layer. With this, the rotating electric machine can be rotated stably for a long time. Thus, a rotating electric machine according to the present invention is usable under a highly radioactive environment having, for example, about $10^{10}$ rad. The grease may be a radiation resistant grease. With this, the rotor can more stably be supported in the bearing.

DESCRIPTION OF THE PREFERRED EMBODIMENTS

Figure 1:
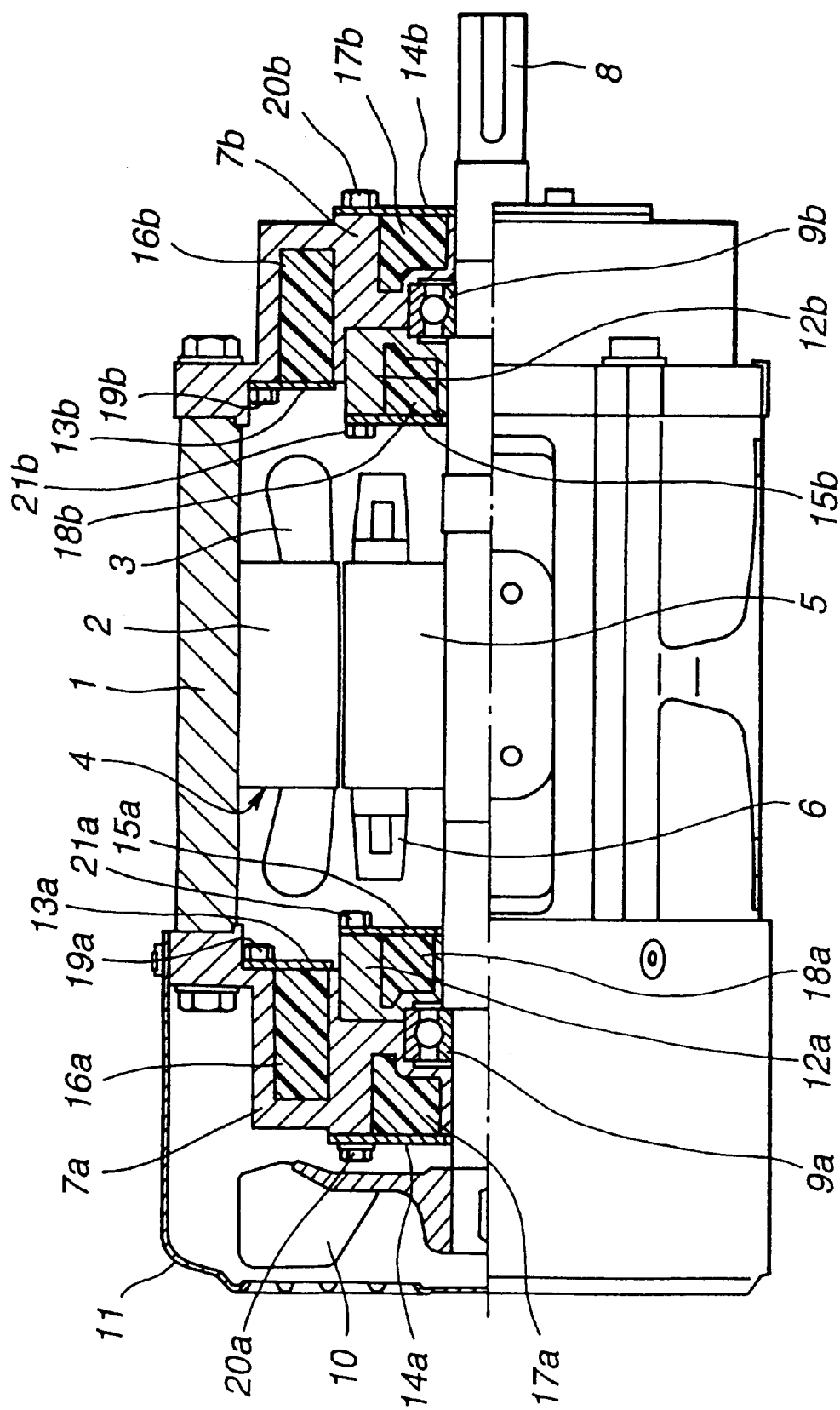
FIG. 1 is a partially sectioned front view of a rotating electric machine according to the present invention.

FIGURE shows a rotating electric machine (three-phase induction motor) according to the present invention. This machine has a stator 4 fixed to the inner surface of a cylindrical frame 1. This stator 4 has a stator core 2 and a stator coil 3 mounted on the stator core 2. The stator coil 3 is formed by winding a wire. The rotating electric machine has brackets 7a, 7b, which are fixed to the both ends of the frame 1 in a manner to close the both openings of the frame 1. Each of these brackets 7a, 7b serves as an outer lid of the rotating electric machine. A rotor core 5, having thereon a secondary conductor 6, is rotatably supported in bearings 9a, 9b at a rotating shaft 8, as illustrated. The rotor core 5 is disposed in an inner space defined by the stator 4, as illustrated. The bearings 9a, 9b are held by the respective brackets 7a, 7b, 12a, 12b at predetermined positions, to support the rotating shaft 8, as shown in FIGURE. A fan 10 is fixed to an end portion of the rotating shaft 8 and thus becomes rotatable together with the rotating shaft 8. An outer cover 11 is fixed to the frame 1 in a manner to cover the fan 10 and the bracket 7a.

In the invention, as stated above, a shield layer, made of lead, for shielding the grease from radiation is provided in a manner to surround the bearings 9a, 9b, as shown in FIGURE. Herein, the shield layer may be defined as being a combination of first cylindrical shield members 16a, 16b and second and third disk shield members 17a, 17b, 18a, 18b (see FIGURE). Alternatively, according to need, the shield layer may be one-piece in construction. The first, second and third shield members are arranged to be closely positioned relative to each other, as shown in FIGURE, to substantially fully surround the bearings 9a, 9b. Therefore, the bearings 9a, 9b are shielded from radiations in substantially all directions. In fact, the bearings 9a, 9b are shielded by the cylindrical shield members 16a, 16b from a first radiation that is in a direction substantially perpendicular to the axis of the rotating shaft 8. The second and third disk shield members 17a, 18a, 17b, 18b are positioned to interpose therebetween the bearings 9a, 9b in a direction along the axis of the rotating shaft 8. With this, the bearings 9a, 9b are shielded from a second radiation that is in a direction substantially along the axis of the rotating shaft 8. Each of the first, second and third shield members is positioned about the rotating shaft 8 and has a central void space which the rotating shaft 8 passes through. The brackets 7a, 7b have cavities in which the first and second shield members 16a, 16b, 17a, 17b are fitted, respectively. The brackets 12a, 12b have cavities for receiving therein the third shield members 18a, 18b, respectively. The first shield members 16a, 16b are held in the respective cavities of the brackets 7a, 7b by fixing plates 13a, 13b to the brackets 7a, 7b with bolts 19a, 19b, respectively. Similarly, the second shield members 17a, 17b are held in the respective cavities of the brackets 7a, 7b by fixing plates 14a, 14b to the brackets 7a, 7b with bolts 20a, 20b, respectively. The third shield members 18a, 18b are held in the respective cavities of the brackets 12a, 12b by fixing plates 15a, 15b to the brackets 12a, 12b with bolts 21a, 21b, respectively. It is preferable to use stainless steel, due to its high radiation resistivity, as a material for producing the plates 13a, 13b, 14a, 14b, 15a, 15b and the bolts 19a, 19b, 20a, 20b, 21a, 21b. Herein, these plates are referred to as "a holding member", too. The material for producing these plates and bolts is, however, not limited to stainless steel. In fact, a common steel, other than stainless steel, or aluminum may be used as that. Alternatively, the first, second and third shield members may be prepared by pouring a molten lead into the first, second and third cavities of the brackets 7a, 7b, 12a, 12b and then by hardening the molten lead therein. In this case, it becomes possible to omit the above-mentioned plates and bolts. Due to the provision of the shield members, the grease applied to the bearings 9a, 9b becomes sufficiently long in lifetime. Thus, the rotor 5 can stably be rotated for a long time. The shielding effect of the shield members varies depending on the thickness of the same. In fact, the radiation can be decreased by a factor of about 10 by the provision of a shield member having a thickness of 15 mm. Thus, according to need, the thickness of the shield member(s) can be changed.

In the invention, it is optional to apply a special radiation resistant grease to the bearing for supporting the rotating shaft of the rotating electric machine, thereby to more stably support the rotor in the bearing for a long time even under a highly radioactive environment. This special grease comprises (1) a polyphenyl ether having at least three aromatic rings in the molecule and (2) a urea. It is particularly preferable that this urea is a diurea having an aromatic hydrocarbon group in the middle of the molecule and terminated with an aromatic or alicyclic hydrocarbon group. The polyphenyl ether is a base component of the grease, and the urea is a thickener of the grease.

A rotating electric machine according to the present invention is not limited to a three-phase induction motor and can be any type of rotating electric machines.

The entire disclosure of Japanese Patent Application No. 9-304044 filed on Nov. 6, 1997, including specification, claims, drawings and summary, is incorporated herein by reference in its entirety.

What is claimed is:

1. A rotating electric machine comprising:

(a) a rotor having a rotating shaft;

(b) a bearing for supporting said rotating shaft;

(c) a radiation resistant grease applied to said bearing; and (d) a shield layer for shielding said grease from radiation, said shield layer being made of lead and surrounding said bearing, wherein said shield layer comprises (1) a first cylindrical shield member that is positioned to cover said bearing, such that said bearing is shielded from a first radiation that is in a direction substantially perpendicular to an axis of said rotating shaft, and (2) second and third disk shield members that are positioned to interpose therebetween said bearing in a direction along said axis of said rotating shaft, such that said bearing is shielded from a second radiation that is in a direction substantially along said axis of said rotating shaft.

2. A machine according to claim 1, wherein said shield layer has a configuration such that said bearing is substantially fully surrounded by the shield layer.

3. A machine according to claim 1, wherein each of said first, second and third shield members is positioned about said rotating shaft and has a central void space which said rotating shaft passes through.

4. A machine according to claim 1, further comprising a bracket for supporting said bearing at a position, said bracket having first, second and third cavities that respectively receive therein said first, second and third shield members.

5. A machine according to claim 4, further comprising a holding member for holding said first, second and third shield members in said first, second and third cavities of said bracket, respectively.

6. A machine according to claim 5, wherein said holding member is made of stainless steel.

7. A machine according to claim 5, wherein said holding member is secured to said bracket by a bolt.

8. A machine according to claim 7, wherein said bolt is made of stainless steel.

9. A machine according to claim 4, wherein said first, second and third shield members are prepared by pouring a molten lead into said first, second and third cavities of said bracket and then by hardening said molten lead therein.

10. A machine according to claim 1, wherein said grease comprises a polyphenyl ether and a urea.

11. A machine according to claim 10, wherein said polyphenyl ether has at least three aromatic rings in the molecule.

12. A machine according to claim 10, wherein said urea is a diurea having an aromatic hydrocarbon group in a middle of the molecule and terminated with an aromatic or alicyclic hydrocarbon group.

13. A machine according to claim 3, which is a three-phase induction motor.

* * * * *